United States Patent
Yao (10) Patent No.: US 11,176,634 B2
(45) Date of Patent: Nov. 16, 2021

(54) METHODS AND DEVICES OF PICTURE PROCESSING BASED ON EXTERNAL STORAGE DEVICE AND USER INTERFACE DISPLAY

(71) Applicant: GOERTEK TECHNOLOGY CO., LTD., Qingdao (CN)

(72) Inventor: Yanhong Yao, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/760,405

(22) PCT Filed: Dec. 26, 2017

(86) PCT No.: PCT/CN2017/118683
§ 371 (c)(1),
(2) Date: Apr. 29, 2020

(87) PCT Pub. No.: WO2019/085235
PCT Pub. Date: May 9, 2019

(65) Prior Publication Data
US 2020/0334785 A1 Oct. 22, 2020

(30) Foreign Application Priority Data

Oct. 31, 2017 (CN) .......................... 201711045659.9

(51) Int. Cl.
*G06T 1/60* (2006.01)
*H04N 5/341* (2011.01)
(Continued)

(52) U.S. Cl.
CPC ................ *G06T 1/60* (2013.01); *G06F 16/51* (2019.01); *G06T 3/0056* (2013.01);
(Continued)

(58) Field of Classification Search
None
See application file for complete search history.

(56) References Cited

U.S. PATENT DOCUMENTS

2003/0026476 A1* 2/2003 Shiiyama .............. G06T 3/4015
382/165
2004/0136606 A1* 7/2004 Shinbata ................... G06T 5/40
382/274
(Continued)

FOREIGN PATENT DOCUMENTS

CN 202385193 U 8/2012
CN 103164452 A 6/2013

OTHER PUBLICATIONS

CN Office Action in Application No. 201711045659.9 dated Jun. 3, 2020.
(Continued)

*Primary Examiner* — Joni Hsu
(74) *Attorney, Agent, or Firm* — Maschoff Brennan (57) ABSTRACT

Provided are methods and devices of picture processing and user interface display. The method includes: determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface. The present disclosure provides a guarantee for further improving the display effect of a user interface, saves the memory space of an MCU to a large extent, and improves the user experience.

18 Claims, 2 Drawing Sheets

(51) Int. Cl.
G06T 3/40 (2006.01)
G06F 16/51 (2019.01)
G06T 3/00 (2006.01)

(52) U.S. Cl.
CPC ......... *G06T 3/4038* (2013.01); *H04N 5/3415* (2013.01); *G06T 2200/32* (2013.01)

(56) References Cited

U.S. PATENT DOCUMENTS

| | | | | |
|---|---|---|---|---|
| 2008/0259844 | A1* | 10/2008 | Richeson | H04M 11/002 370/328 |
| 2009/0063514 | A1* | 3/2009 | Murphy | G06F 16/58 |
| 2009/0185762 | A1 | 7/2009 | He et al. | |
| 2011/0078335 | A1* | 3/2011 | Lee | G06F 9/445 710/3 |
| 2012/0278747 | A1* | 11/2012 | Abraham | G06F 9/45537 715/771 |
| 2016/0048973 | A1* | 2/2016 | Takenaka | G06K 9/6202 382/199 |

OTHER PUBLICATIONS

Chinese Office Action dated Sep. 20, 2019 as received in Application No. 20171045659.9.
Chinese Office Action dated Mar. 12, 2020 as received in Application No. 20171045659.9.

* cited by examiner

METHODS AND DEVICES OF PICTURE PROCESSING BASED ON EXTERNAL STORAGE DEVICE AND USER INTERFACE DISPLAY

TECHNICAL FIELD

The present disclosure relates to the field of electronic technology, and in particular to methods and devices of picture processing and user interface display.

BACKGROUND

At present, intelligent electronic devices have been rapidly developed and popularized. In order to reduce production costs, more and more electronic devices, especially wearable devices, adopt MCU (Micro Control Unit) combined with OLED (Organic Light-Emitting Diode) screen way realizes the display requirements of electronic devices.

In the prior art, UI (User Interface) data is stored in the internal storage space of the MCU, and the MCU can directly read pictures in the user interface data for user interface display according to the display requirements. To improve the display effect, the types of UI display content are becoming more and more diverse, and the display requirements of pictures and animations are also increasing. However, in order to reduce production costs, the internal storage space of the adopted MCU is limited, which may not meet the storage requirements of a large number of pictures and animations, so that the display effect of the user interface may not be further improved.

SUMMARY

In view of so, the present disclosure provides methods and devices of picture processing and user interface display to solve the technical problem of limited internal storage resource of the electronic device, further improves the display effect of the user interface, and improves the user experience.

In order to solve the above technical problem, the present disclosure provides a method of picture processing, which may include:

determining at least one picture in user interface data corresponding to a user interface;

storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface.

Preferably, the storing the at least one picture to an external storage device in an electronic device includes:

performing data conversion on each picture to obtain conversion data of each picture according to a screen display requirement; and storing the conversion data of each picture to the external storage device in the electronic device.

Preferably, the performing data conversion on each picture to obtain conversion data of each picture according to a screen display requirement includes:

extracting valid data of each picture; and performing the data conversion on the valid data of each picture to obtain the conversion data of each picture according to the screen display requirement.

Preferably, the storing the conversion data of each picture to the external storage device in the electronic device includes:

performing data stitching on the conversion data of multiple pictures to generate a data file corresponding to the multiple pictures; and storing the data file to the external storage device in the electronic device.

Preferably, the index identifier includes a UI identifier, an identifier about a picture type and a storage location of each picture in the external storage device;

and the generating an index identifier based on a storage location of the at least one image picture in the external storage device includes:

generating the index identifier based on the storage location of each picture in the external storage device, the UI identifier and the identifier about the picture type.

The present disclosure provides a method of user interface display, which may include:

obtaining an index identifier of each picture in user interface data corresponding to a user interface, where the index identifier is generated based on a storage location of at least one picture of the user interface data in an external flash;

reading the at least one picture from an external storage device based on the storage location indexed by the index identifier; and displaying the user interface based on the at least one picture.

The present disclosure provides a device of picture processing, which may include a memory and a processing component, where the memory is used for storing computer-readable program code, and the processing component is used for executing the computer-readable program code to implement:

determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface.

Preferably, the storing the at least one picture to an external storage device in an electronic device specifically is:

performing data conversion on each picture to obtain conversion data of each picture according to a screen display requirement; and storing the conversion data of each picture to the external storage device in the electronic device.

Preferably, the performing data conversion on each picture to obtain conversion data of each picture according to a screen display requirement specifically is:

extracting valid data of each picture; and performing the data conversion on the valid data of each picture to obtain the conversion data of each picture according to the screen display requirement.

Preferably, the storing the conversion data of each picture to the external storage device in the electronic device specifically is:

performing data stitching on the conversion data of multiple pictures to generate a data file corresponding to the multiple pictures; and storing the data file to the external storage device in the electronic device.

Preferably, the index identifier includes a UI identifier, an identifier about a picture type and a storage location of each picture in the external storage device;

and where the generating an index identifier based on a storage location of the at least one image picture in the external storage device specifically is:

generating the index identifier based on the storage location of each picture in the external storage device, the UI identifier and the identifier about the picture type.

The present disclosure further provides a device of user interface display, which may include: an MCU and an external storage device, where the external storage device is used for storing at least one picture in user interface data, and the MCU is used for storing computer-readable program code and executing the computer-readable program code to implement:

obtaining an index identifier of each picture in user interface data corresponding to a user interface, where the index identifier is generated based on a storage location of at least one picture of the user interface data in an external flash; reading the at least one picture from an external storage device based on the storage location indexed by the index identifier; and displaying the user interface based on the at least one picture.

Compared with the prior art, the present disclosure may obtain the following technical effect:

The present disclosure provides a method of picture processing, a method of user interface display and devices thereof. By determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface, the present disclosure may achieve the storage of the user interface data by only the external storage device, provides a guarantee for further improving the display effect of a user interface, saves the memory space of an MCU to a large extent, and improves the user experience.

DETAILED DESCRIPTION OF EXAMPLE EMBODIMENTS

The embodiments of the present disclosure will be described in detail below with reference to the accompanying drawings and embodiments, so as to fully understand and implement the implementation process of how the present disclosure applies technical means to solve technical problems and achieve technical effects.

The solution of the embodiment of the present disclosure is applicable to, but not limited to, any electronic device that requires user interface display, and is applicable to, but not limited to, the electronic device that is applicable to an OLED (Organic Light-Emitting Diode) screen.

In order to solve the technical problems of limited internal storage space and limited UI resources of the electronic device, the inventor proposed a technical solution of the present disclosure through a series of studies. In the present disclosure, by determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface, the present disclosure may achieve the storage of the user interface data by only the external storage device, provides a guarantee for further improving the display effect of a user interface, saves the memory space of an MCU to a large extent, and improves the user experience.

The technical solution of the present disclosure will be described in detail below with reference to the drawings.

Figure 1:
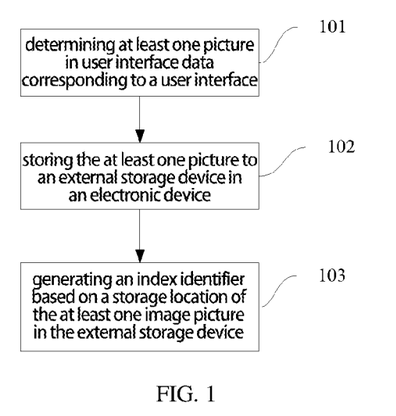
FIG. 1 is a flowchart of an embodiment of a method of picture processing according to an embodiment of the present disclosure.

FIG. 1 is a flowchart of an embodiment of a method of picture processing according to an embodiment of the present disclosure. The method may include:

101: determining at least one picture in user interface data corresponding to a user interface.

The user interface (UI) is a medium for interaction and information exchange between the system and the user. It implements the conversion between the internal form of information and the form that the user can accept.

The user interface may include multiple (at least two), for example, the user interface for turning on/off, the application interface, the desktop, etc. all belong to the category of user interface. The user interface is usually displayed and interacted in the form of pictures and animations, and different user interfaces correspond to different user interface data. The user interface data may include at least one picture for separate display or multiple pictures (at least two pictures) forming an animation that need to be displayed continuously.

102: storing the at least one picture to an external storage device in an electronic device.

The electronic device may include a microprocessor MCU and an external storage device. The external storage device refers to a storage device other than computer memory and CPU cache. Such storage device may generally save data even after power is cut off. Common external storage device may include hard disk, floppy disk, optical disk, and USB flash drive.

103: generating an index identifier based on a storage location of the at least one image picture in the external storage device.

The index identifier is used by the electronic device to read the at least one picture in the external storage device indexed by the index identifier for displaying the user interface.

Optionally, as still another embodiment, the storing the at least one picture to an external storage device in an electronic device may include:

performing data conversion on each picture to obtain conversion data of each picture according to a screen display requirement; and storing the conversion data of each picture to the external storage device in the electronic device.

Different display screens have different display requirements. Therefore, in order to make the picture data suitable for the display screen display requirements according to the electronic device settings, data conversion is required for each picture to obtain conversion data of each picture. Of course, the data conversion may also be performed on this picture according to the different requirements of the screen scanning method. In addition, this data conversion process may also be compressed as needed, but you need to pay attention to using lossless compression to avoid reducing the sharpness of the picture display.

Optionally, different data conversion rules may be set for pictures in different formats according to conversion requirements. For example, pictures in BMP format and pictures in JPEG format are based on different data conversion rules.

Of course, the conversion data with regard to each picture may also be encapsulated, that is, add header information, where the header information of each picture includes the picture header, the width and height of the picture, so the size information of the storage space that each picture takes may be obtained by using the header information of this picture, and then the encapsulated conversion data is packet to obtain a data packet for each picture.

Optionally, in some embodiments, the index identifier includes a UI identifier, an identifier about a picture type and a storage location of each picture in the external storage device.

The generating an index identifier based on a storage location of the at least one image picture in the external storage device may include:

generating the index identifier based on the storage location of each picture in the external storage device, the UI identifier and the identifier about the picture type.

Each user interface data corresponds to one UI identifier, and the UI identifier may be defined by a developer, for example, user interface data for turning on/off display, and the UI identifier of the user interface data may be set as a turning on/off UI identifier. The user interface data with the same UI identifier may be one or more, and the one or more UI data may include at least one picture. At the same time, the identifier about the picture type of the picture in the UI data may be determined according to whether the pictures in the UI data are related. The identifier about the picture type may be divided into a single picture identifier and an animation identifier.

Therefore, when determining at least one picture in the user interface data corresponding to the user interface, a UI identifier and an identifier about a picture type corresponding to the at least one picture may be determined.

According to the different identifiers about the picture type, the index identifier may be divided into an index identifier of a single picture and an index identifier of multiple pictures forming an animation. Both types of index identifiers use the UI identifier as the name of the index identifier, and the MCU determines the index identifier to be called according to the name of the index identifier. The picture type of the index mark may be indicated in the header information of the index identifier, and the header information of the index identifier contains the identifier about the picture type, the picture width and picture height information. When the picture type is a single picture, the identifier about the picture type in the header information is "1". When the picture type is multiple pictures, the identifier about the picture type in the header information is a value greater than "1". Based on the header information, how many pictures are in the called animation may be directly learned. The storage location of the picture is used as the content of the index identifier. When the identifier about the picture type is a single picture, the content of the index identifier includes the storage location of only one picture. When the identifier about the picture type is multiple pictures forming an animation, the content of the index identifier includes the storage location information of multiple pictures, and storage locations of each of the multiple pictures are set under the same folder.

In the embodiment of the present disclosure, by determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface, the present disclosure may achieve the storage of the user interface data by only the external storage device, provides a guarantee for further improving the display effect of a user interface, saves the memory space of an MCU to a large extent, and improves the user experience.

In order to further save the storage space of the electronic device and reduce the production cost of the electronic device, in some embodiments, the performing data conversion on each picture to obtain conversion data of each picture according to a screen display requirement includes:

extracting valid data of each picture; and performing the data conversion on the valid data of each picture to obtain the conversion data of each picture according to the screen display requirement.

Generally, the picture includes not only data information to be displayed, but also other data information that does not need to be displayed, such as author information, time information, and picture size information. Therefore, in order to further save the storage space of the electronic device, the conversion data of each picture may be obtained by extracting valid data information for display only in each picture, and performing data conversion on the valid data of each picture according to the screen display requirement.

Further, in order to further save the storage space of the electronic device, the conversion data of multiple pictures may be stitched together by data stitching to form a data file for storage. In some embodiments, the storing the conversion data of each picture to the external storage device in the electronic device includes:

performing data stitching on the conversion data of multiple pictures to generate a data file corresponding to the multiple pictures; and storing the data file to the external storage device in the electronic device.

The data stitching may be performed according to the arrangement order of pictures or the order of data conversion of the pictures, and the stitching order of conversion data of multiple pictures is not specifically limited herein.

Figure 2:
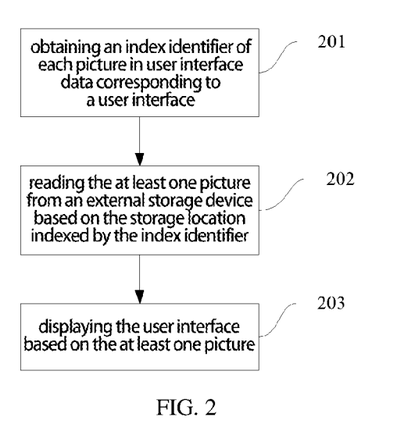
FIG. 2 is a flowchart of an embodiment of a method of user interface display according to an embodiment of the present disclosure.

FIG. 2 is a flowchart of an embodiment of a method of user interface display according to an embodiment of the present disclosure. This method may be applied to an electronic device and the method may include:

201: obtaining an index identifier of each picture in user interface data corresponding to a user interface.

The index identifier is generated based on a storage location of at least one picture of the user interface data in an external flash.

202: reading the at least one picture from an external storage device based on the storage location indexed by the index identifier.

203: displaying the user interface based on the at least one picture.

The index identifier is stored in the MCU of the electronic device, and the electronic device obtains the storage location of each picture by obtaining the index identifier of each picture in the user interface data corresponding to the user interface that needs to be displayed according to the actual needs of the user interface. The user interface display is achieved by reading at least one picture of the storage location.

In the embodiment of the present disclosure, the user interface display is achieved by obtaining the storage location of at least one picture in the user interface data based on the index identifier and reading the at least one picture from the external storage device. The present disclosure may achieve the storage of the user interface data by only the external storage device, provides a guarantee for further improving the display effect of a user interface, saves the memory space of an MCU to a large extent, and improves the user experience.

Figure 3:
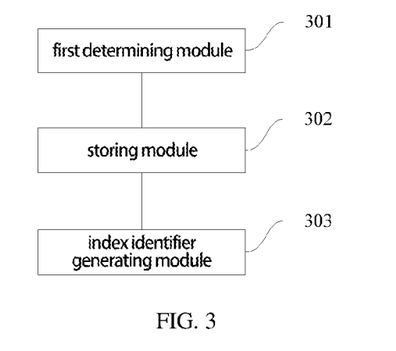
FIG. 3 is a schematic structural diagram of an embodiment of an apparatus of picture processing according to an embodiment of the present disclosure.

FIG. 3 is a schematic structural diagram of an embodiment of an apparatus of picture processing according to an embodiment of the present disclosure, which may include:

A first determining module 301, is configured to determine at least one picture in user interface data corresponding to a user interface.

The user interface (UI) is a medium for interaction and information exchange between the system and the user. It implements the conversion between the internal form of information and the form that the user can accept.

The user interface may include multiple (at least two), for example, the user interface for turning on/off, the application interface, the desktop, etc. all belong to the category of user interface. The user interface is usually displayed and interacted in the form of pictures and animations, and different user interfaces correspond to different user interface data. The user interface data may include at least one picture for separate display or multiple pictures (at least two pictures) forming an animation that need to be displayed continuously.

A storing module 302, is configured to store the at least one picture to an external storage device in an electronic device.

The electronic device may include a microprocessor MCU and an external storage device. The external storage device refers to a storage device other than computer memory and CPU cache. Such storage device may generally save data even after power is cut off. Common external storage device may include hard disk, floppy disk, optical disk, and USB flash drive.

An index identifier generating module 303, is configured to generate an index identifier based on a storage location of the at least one image picture in the external storage device.

The index identifier is used by the electronic device to read the at least one picture in the external storage device indexed by the index identifier for displaying the user interface.

Optionally, as still another embodiment, the storing module 302 may include:

a data converting unit, which is configured to perform data conversion on each picture to obtain conversion data of each picture according to a screen display requirement; and a data storing unit, which is configured to store the conversion data of each picture to the external storage device in the electronic device.

Different display screens have different display requirements. Therefore, in order to make the picture data suitable for the display screen display requirements according to the electronic device settings, data conversion is required for each picture to obtain conversion data of each picture. Of course, the data conversion may also be performed on this picture according to the different requirements of the screen scanning method. In addition, this data conversion process may also be compressed as needed, but you need to pay attention to using lossless compression to avoid reducing the sharpness of the picture display.

Optionally, different data conversion rules may be set for pictures in different formats according to conversion requirements. For example, pictures in BMP format and pictures in JPG format are based on different data conversion rules.

Of course, the conversion data with regard to each picture may also be encapsulated, that is, add header information, where the header information of each picture includes the picture header, the width and height of the picture, so the size information of the storage space that each picture takes may be obtained by using the header information of this picture, and then the encapsulated conversion data is packet to obtain a data packet for each picture.

Optionally, in some embodiments, the index identifier includes a UI identifier, an identifier about a picture type and a storage location of each picture in the external storage device.

The index identifier generating module 303 may specifically configured to:

generate the index identifier based on the storage location of each picture in the external storage device, the UI identifier and the identifier about the picture type.

Each user interface data corresponds to one UI identifier, and the UI identifier may be defined by a developer, for example, user interface data for turning on/off display, and the UI identifier of the user interface data may be set as a turning on/off UI identifier. The user interface data with the same UI identifier may be one or more, and the one or more UI data may include at least one picture. At the same time, the identifier about the picture type of the picture in the UI data may be determined according to whether the pictures in the UI data are related. The identifier about the picture type may be divided into a single picture identifier and an animation identifier.

Therefore, when determining at least one picture in the user interface data corresponding to the user interface, a UI identifier and a identifier about a picture type corresponding to the at least one picture may be determined.

According to the different identifiers about the picture type, the index identifier may be divided into an index identifier of a single picture and an index identifier of multiple pictures forming an animation. Both types of index identifiers use the UI identifier as the name of the index identifier, and the MCU determines the index identifier to be called according to the name of the index identifier. The picture type of the index mark may be indicated in the header information of the index identifier, and the header information of the index identifier contains the identifier about the picture type, the picture width and picture height information. When the picture type is a single picture, the identifier about the picture type in the header information is "1". When the picture type is multiple pictures, the identifier about the picture type in the header information is a value greater than "1". Based on the header information, how many pictures are in the called animation may be directly learned. The storage location of the picture is used as the content of the index identifier. When the identifier about the picture type is a single picture, the content of the index identifier includes the storage location of only one picture. When the identifier about the picture type is multiple pictures forming an animation, the content of the index identifier includes the storage location information of multiple pictures, and storage locations of each of the multiple pictures are set under the same folder.

In the embodiment of the present disclosure, by determining at least one picture in user interface data corresponding to a user interface; storing the at least one picture to an external storage device in an electronic device; and generating an index identifier based on a storage location of the at least one image picture in the external storage device, where the index identifier is used by the electronic device to read the at least one picture in the external storage device indexed by the index identifier for displaying the user interface, the present disclosure may achieve the storage of the user interface data by only the external storage device, provides a guarantee for further improving the display effect of a user interface, saves the memory space of an MCU to a large extent, and improves the user experience.

In order to further save the storage space of the electronic device and reduce the production cost of the electronic device, in some embodiments, the data conversing unit is specifically configured to:

extract valid data of each picture; and perform the data conversion on the valid data of each picture to obtain the conversion data of each picture according to the screen display requirement.

Generally, the picture includes not only data information to be displayed, but also other data information that does not need to be displayed, such as author information, time information, and picture size information. Therefore, in order to further save the storage space of the electronic device, the conversion data of each picture may be obtained by extracting valid data information for display only in each picture, and performing data conversion on the valid data of each picture according to the screen display requirement.

Further, in order to further save the storage space of the electronic device, the conversion data of multiple pictures may be stitched together by data stitching to form a data file for storage. In some embodiments, the data storing unit may be specifically configured to:

perform data stitching on the conversion data of multiple pictures to generate a data file corresponding to the multiple pictures; and store the data file to the external storage device in the electronic device.

The data stitching may be performed according to the arrangement order of pictures or the order of data conversion of the pictures, and the stitching order of conversion data of multiple pictures is not specifically limited herein.

Figure 4:
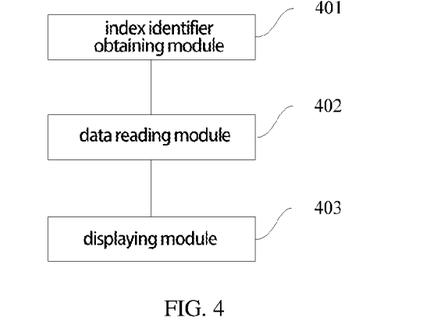
FIG. 4 is a schematic structural diagram of an embodiment of an apparatus of user interface display according to an embodiment of the present disclosure.

FIG. 4 is a schematic structural diagram of an embodiment of an apparatus of user interface display according to an embodiment of the present disclosure, which may include:

An index identifier obtaining module 401, is configured to obtain an index identifier of each picture in user interface data corresponding to a user interface.

The index identifier is generated based on a storage location of at least one picture of the user interface data in an external flash.

A data reading module 402, is configured to read the at least one picture from an external storage device based on the storage location indexed by the index identifier.

A displaying module 403, is configured to display the user interface based on the at least one picture.

The index identifier is stored in the MCU of the electronic device, and the electronic device obtains the storage location of each picture by obtaining the index identifier of each picture in the user interface data corresponding to the user interface that needs to be displayed according to the actual needs of the user interface. The user interface display is achieved by reading at least one picture of the storage location.

In the embodiment of the present disclosure, the user interface display is achieved by obtaining the storage location of at least one picture in the user interface data based on the index identifier and reading the at least one picture from the external storage device. The present disclosure may achieve the storage of the user interface data by only the external storage device, provides a guarantee for further improving the display effect of a user interface, saves the memory space of an MCU to a large extent, and improves the user experience.

Figure 5:
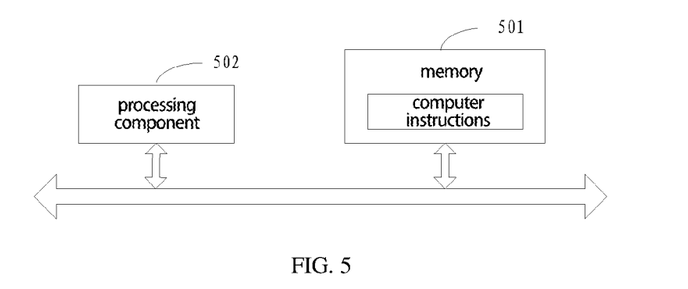
FIG. 5 is a schematic structural diagram of an embodiment of a device of picture processing according to an embodiment of the present disclosure.

FIG. 5 is a schematic structural diagram of an embodiment of a device of picture processing according to an embodiment of the present disclosure, which includes a memory 501 and a processing component 502.

The memory 501 is used for storing computer-readable program code, and the processing component 502 is used for executing the computer-readable program code to implement:

determining at least one picture in user interface data corresponding to a user interface;

storing the at least one picture to an external storage device in an electronic device; and generating an index identifier based on a storage location of the at least one image picture in the external storage device.

The index identifier is used by the electronic device to read the at least one picture in the external storage device indexed by the index identifier for displaying the user interface.

Optionally, the processing component 502 is further configured to execute all or part of the foregoing method steps.

The processing component 502 may include one or more processors to execute computer instructions. Of course, the second processing component may also be implemented by one or more application-specific integrated circuit (ASIC), digital signal processor (DSP), digital signal processing device (DSPD), programmable logic device (PLD), field programmable gate array (FPGA), controller, microcontroller, microprocessor, or other electronic components to perform the method described above.

The memory 501 may be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

Of course, the electronic device may further include other components, such as an input/output interface, a communication component, and the like. The input/output interface provides an interface between the processing component and a peripheral interface module. The peripheral interface module may be an output device, an input device, and the like. The communication component is configured to facilitate wired or wireless communication between the mobile device and other devices, such as communication with a control device, and so on.

An embodiment of the present disclosure provides a computer program product including a computer-readable storage medium for storing computer instructions used by the key detection device according to the embodiment of the present disclosure, which includes procedures involved by a method for performing the key detection method in any one of the foregoing embodiments.

Figure 6:
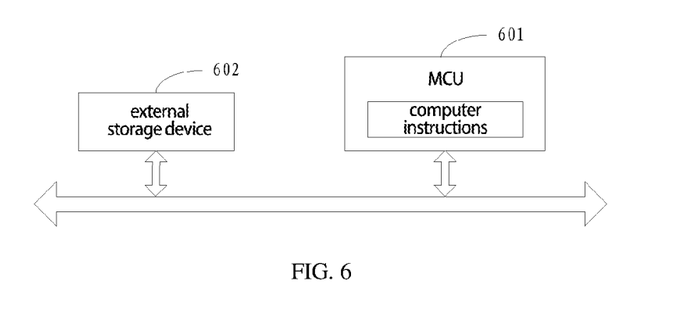
FIG. 6 is a schematic structural diagram of an embodiment of a device of user interface display according to an embodiment of the present disclosure.

FIG. 6 is a schematic structural diagram of an embodiment of a device of user interface display according to an embodiment of the present invention, which includes: an MCU (Micro Control Unit) 601 and an external storage device 602.

The external storage device 602 is used for storing at least one picture in user interface data, and the MCU 601 is used for storing computer-readable program code and executing the computer-readable program code to implement:

obtaining an index identifier of each picture in user interface data corresponding to a user interface;

where the index identifier is generated based on a storage location of at least one picture of the user interface data in an external flash;

reading the at least one picture from an external storage device based on the storage location indexed by the index identifier; and displaying the user interface based on the at least one picture.

Optionally, the MCU 601 is further configured to execute all or part of the foregoing method steps.

The MCU 601 may be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

Of course, the electronic device may further include other components, such as an input/output interface, a communication component, and the like. The input/output interface provides an interface between the processing component and a peripheral interface module. The peripheral interface module may be an output device, an input device, and the like. The communication component is configured to facilitate wired or wireless communication between the mobile device and other devices, such as communication with a control device, and so on.

An embodiment of the present disclosure provides a computer program product including a computer-readable storage medium for storing computer instructions used by the key detection device according to the embodiment of the present disclosure, which includes procedures involved by a method for performing the key detection method in any one of the foregoing embodiments.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

Certain words are used in the description and claims to refer to specific components. Those skilled in the art will understand that hardware manufacturers may use different terms to refer to the same component. This specification and claims do not use the differences in names as a way to distinguish components, but the differences in functions of components as a criterion for distinguishing between components. As used throughout the specification and claims, "comprising" is an open-ended term and should be interpreted as "including but not limited to". "Approximately" means that within the acceptable error range, those skilled in the art can solve the technical problem within a certain error range, and basically achieve the technical effect. In addition, the term "coupling" includes any direct and indirect electrical coupling means. Therefore, if a first apparatus is described as being coupled to a second apparatus, it means that the first apparatus can be directly electrically coupled to the second apparatus, or indirectly electrically coupled to the second device through other apparatuses or coupling means. The subsequent description of the specification is a preferred embodiment for implementing the present disclosure, but the description is for the purpose of illustrating the general principles of the present disclosure and is not intended to limit the scope of the present disclosure. The scope of protection of the present disclosure shall be determined by the scope defined by the appended claims.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above description shows and describes several preferred embodiments of the present disclosure, but as mentioned before, it should be understood that the present disclosure is not limited to the form disclosed herein, and should not be regarded as an exclusion of other embodiments, but can be used for each other combinations, modifications, and environments, and can be altered within the scope of the application concept described herein, through the teachings above or related technology or knowledge in the relevant field. Modifications and changes made by those skilled in the art without departing from the spirit and scope of the present disclosure should all fall within the protection scope of the appended claims of the present disclosure.

What is claimed is:

1. A method of picture processing, comprising:
determining at least one picture in user interface data of a user interface;
storing the at least one picture to an external storage device in an electronic device; and
generating an index identifier based on a storage location of the at least one image picture in the external storage device, wherein the index identifier is used by the electronic device to read the at least one picture in the external storage device indexed by the index identifier for displaying the user interface.

2. The method according to claim 1, wherein the storing the at least one picture to an external storage device in an electronic device comprises:
performing data conversion on each picture to obtain conversion data of each picture according to a screen display requirement; and
storing the conversion data of each picture to the external storage device in the electronic device.

3. The method according to claim 2, wherein the performing data conversion on each picture to obtain conversion data of each picture according to a screen display requirement comprises:
extracting valid data of each picture; and
performing the data conversion on the valid data of each picture to obtain the conversion data of each picture according to the screen display requirement.

4. The method according to claim 2, wherein the storing the conversion data of each picture to the external storage device in the electronic device comprises:
performing data stitching on the conversion data of multiple pictures to generate a data file corresponding to the multiple pictures; and
storing the data file to the external storage device in the electronic device.

5. The method according to claim 1, wherein the index identifier comprises a UI identifier, an identifier about a picture type and a storage location of each picture in the external storage device;
and wherein the generating an index identifier based on a storage location of the at least one image picture in the external storage device comprises:
generating the index identifier based on the storage location of each picture in the external storage device, the UI identifier and the identifier about the picture type.

6. The method according to claim 1, wherein the index identifier is stored in a Micro Control Unit in the electronic device.

7. The method according to claim 1, wherein the user interface comprises at least one of a user interface for turning on, a user interface for turning off, an application interface, and the desktop.

8. A device of picture processing, comprising a memory and a processing component, wherein the memory is used for storing computer-readable program code, and the processing component is used for executing the computer-readable program code to implement:
determining at least one picture in user interface data of a user interface; storing the at least one picture to an external storage device in an electronic device; and generating an index identifier based on a storage location of the at least one image picture in the external storage device, wherein the index identifier is used by the electronic device to read the at least one picture in the external storage device indexed by the index identifier for displaying the user interface.

9. The device according to claim 8, wherein the storing the at least one picture to an external storage device in an electronic device specifically is:
performing data conversion on each picture to obtain conversion data of each picture according to a screen display requirement; and storing the conversion data of each picture to the external storage device in the electronic device.

10. The device according to claim 9, wherein the performing data conversion on each picture to obtain conversion data of each picture according to a screen display requirement specifically is:
extracting valid data of each picture; and
performing the data conversion on the valid data of each picture to obtain the conversion data of each picture according to the screen display requirement.

11. The device according to claim 9, wherein the storing the conversion data of each picture to the external storage device in the electronic device specifically is:
performing data stitching on the conversion data of multiple pictures to generate a data file corresponding to the multiple pictures; and storing the data file to the external storage device in the electronic device.

12. The device according to claim 8, wherein the index identifier comprises a UI identifier, an identifier about a picture type and a storage location of each picture in the external storage device;
and wherein the generating an index identifier based on a storage location of the at least one image picture in the external storage device specifically is:
generating the index identifier based on the storage location of each picture in the external storage device, the UI identifier and the identifier about the picture type.

13. The device according to claim 8, wherein the index identifier is stored in a Micro Control Unit in the electronic device.

14. The device according to claim 8, wherein the user interface comprises at least one of a user interface for turning on, a user interface for turning off, an application interface, and the desktop.

15. A device of user interface display, comprising a Micro Control Unit and an external storage device, wherein the external storage device is used for storing at least one picture in user interface data, and the Micro Control Unit is used for storing computer-readable program code and executing the computer-readable program code to implement:
obtaining an index identifier of each picture in user interface data of a user interface, wherein the index identifier is generated based on a storage location of at least one picture of the user interface data in an external flash; reading the at least one picture from an external storage device based on the storage location indexed by the index identifier; and displaying the user interface based on the at least one picture.

16. The device according to claim 15, wherein the index identifier is stored in the Micro Control Unit.

17. The device according to claim 15, wherein the user interface comprises at least one of a user interface for turning on, a user interface for turning off, an application interface, and the desktop.

18. The device according to claim 15, wherein the index identifier comprises a UI identifier, an identifier about a picture type and a storage location of each picture in the external storage device.

* * * * *